United States Patent
Gou

(10) Patent No.: US 10,479,222 B2
(45) Date of Patent: Nov. 19, 2019

(54) WIRELESS CHARGING VEHICLE AND WIRELESS CHARGING ROAD

(71) Applicant: HON HAI PRECISION INDUSTRY CO., LTD., New Taipei (TW)

(72) Inventor: Tai-Ming Gou, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 37 days.

(21) Appl. No.: 15/912,651

(22) Filed: Mar. 6, 2018

(65) Prior Publication Data

US 2019/0118659 A1 Apr. 25, 2019

Related U.S. Application Data

(60) Provisional application No. 62/574,827, filed on Oct. 20, 2017.

(51) Int. Cl.
| | | |
|---|---|---|
| *H02J 7/00* | (2006.01) | |
| *B60L 53/12* | (2019.01) | |
| *H02J 50/10* | (2016.01) | |
| *H02J 7/02* | (2016.01) | |
| *H01M 10/44* | (2006.01) | |
| *B60L 53/30* | (2019.01) | |

(52) U.S. Cl.
CPC ............ *B60L 53/12* (2019.02); *B60L 53/32* (2019.02); *H01M 10/44* (2013.01); *H02J 7/025* (2013.01); *H02J 50/10* (2016.02)

(58) Field of Classification Search
CPC . B60L 53/12; B60L 53/32; H02J 50/10; H02J 7/025; H01M 10/44
See application file for complete search history.

(56) References Cited

U.S. PATENT DOCUMENTS

| 10,166,875 | B2* | 1/2019 | Ricci | B60L 11/182 |
|---|---|---|---|---|
| 2008/0265684 | A1* | 10/2008 | Farkas | B60L 58/40 |
| | | | | 307/104 |
| 2009/0045773 | A1* | 2/2009 | Pandya | B60L 5/005 |
| | | | | 320/108 |
| 2010/0200316 | A1* | 8/2010 | Gurol | B60L 5/005 |
| | | | | 180/65.31 |
| 2010/0320965 | A1* | 12/2010 | Kissel, Jr. | B60L 5/40 |
| | | | | 320/109 |

(Continued)

FOREIGN PATENT DOCUMENTS

| CN | 103701167 | 4/2014 |
|---|---|---|
| CN | 106300571 | 1/2017 |

*Primary Examiner* — Arun C Williams
(74) *Attorney, Agent, or Firm* — ScienBiziP, P.C.

(57) ABSTRACT

This disclosure relates to a wireless charging road and a wireless charging vehicle. The wireless charging road includes a road basement, a road surface layer located on the road basement, and a magnetic field generator. The magnetic field generator generates magnetic force lines above the road surface layer. The wireless charging vehicle includes a vehicle body, and a charging device located on the vehicle body. The charging device includes an induction wire and a rechargeable battery. Two ends of the induction wire are respectively connected to the positive pole and the negative pole of the rechargeable battery. The induction wire cuts the magnetic force lines to produce an electric potential and charges the rechargeable battery when the wireless charging vehicle drives on the wireless charging road.

19 Claims, 14 Drawing Sheets

(56) References Cited

U.S. PATENT DOCUMENTS

| | | | | |
|---|---|---|---|---|
| 2011/0184842 A1* | 7/2011 | Melen | ............... | B60L 5/005 |
| | | | | 705/34 |
| 2012/0262002 A1* | 10/2012 | Widmer | ............ | B60L 53/65 |
| | | | | 307/104 |
| 2012/0293109 A1* | 11/2012 | Glazer | ............. | F03D 9/255 |
| | | | | 320/101 |
| 2013/0154553 A1* | 6/2013 | Steele | ............. | B60M 7/003 |
| | | | | 320/108 |
| 2014/0042823 A1* | 2/2014 | Nakahara | ......... | H01M 10/46 |
| | | | | 307/104 |
| 2014/0055090 A1* | 2/2014 | Krause | ............ | B60L 11/182 |
| | | | | 320/108 |
| 2014/0070767 A1* | 3/2014 | Morris | ............. | B60L 5/42 |
| | | | | 320/109 |

* cited by examiner

WIRELESS CHARGING VEHICLE AND WIRELESS CHARGING ROAD

CROSS-REFERENCE TO RELATED APPLICATIONS

This application claims the benefit under 35 U.S.C. § 119(c) of U.S. Provisional Application No. 62/574,827 filed Oct. 20, 2017, the disclosure of which is incorporated by reference herein.

BACKGROUND

1. Technical Field

The present disclosure relates to wireless charging technology, especially, relates to wireless charging vehicles and wireless charging roads.

2. Description of Related Art

As the development and popularization of electric vehicle, it attracts more and more attention for how to conveniently charge the electric vehicle within less time. Currently, charging piles are widely used for charging the electric vehicle by wired or wireless. However, it usually needs the electric vehicle to be parked near the charging piles for charging. Thus, it takes a relative long time for charging.

What is needed, therefore, is to provide wireless charging vehicles and wireless charging roads that can overcome the problems as discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
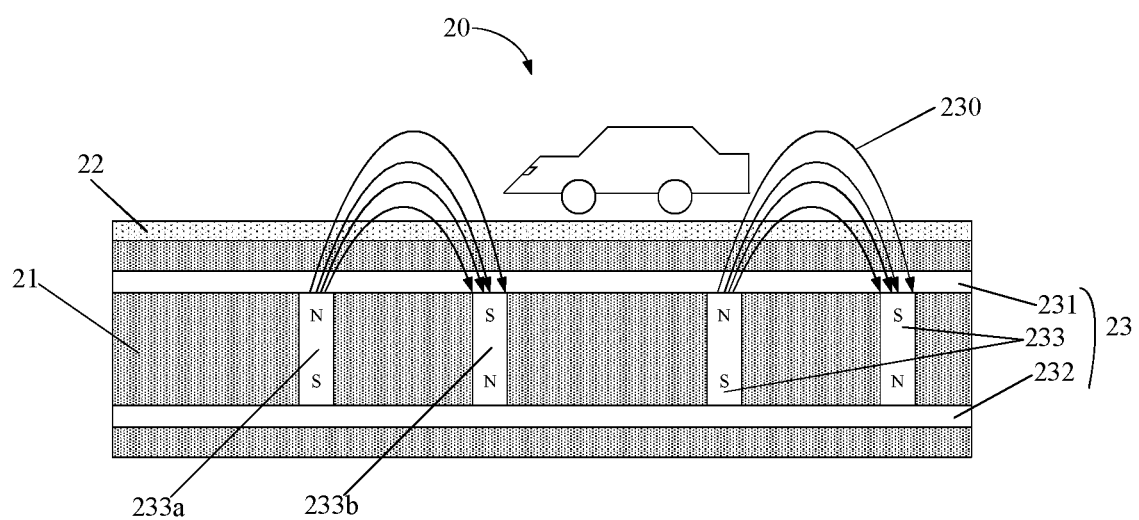
FIG. 1 is a cross-sectional view of a first embodiment of a wireless charging road.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated better illustrate details and features. The description is not to considered as limiting the scope of the embodiments described herein.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

References will now be made to the drawings to describe, in detail, various embodiments of the present wireless charging vehicles and wireless charging roads.

Referring to FIG. 1, a wireless charging road 20 of a first embodiment includes a road basement 21, a road surface layer 22 located on the road basement 21, and a magnetic field generator 23 located in the road basement 21. The magnetic field generator 23 generates magnetic force lines 230 above the road surface layer 22 so that the wireless charging vehicle would cut the magnetic force lines 230 when the wireless charging vehicle drives on the wireless charging road 20.

The wireless charging road 20 can be any road such as a township road, a county road, a provincial road, a national road, or a highway road. The road basement 21 includes material such as gravel, sand, soil, and cement. The road surface layer 22 includes material such as pitch and gravel.

The magnetic field generator 23 includes an upper steel plate 231, a lower steel plate 232 parallel to and spaced apart from the upper steel plate 231, and a plurality of magnetic bodies 233 spaced apart from each other and located between the upper steel plate 231 and the lower steel plate 232. Both the upper steel plate 231 and the lower steel plate 232 are parallel to the road surface layer 22. Both the upper steel plate 231 and the lower steel plate 232 are Austenite nonmagnetic steel plates with high strength such as SS304 or SS316 steel. The shape and thickness of the upper steel plate 231 and the lower steel plate 232 are not limited and can be selected as needed as long as they can bear the weight of the vehicle. The widths of the upper steel plate 231 and the lower steel plate 232 can be in a range of about 1 meter to about 2 meters. In one embodiment, the widths of the upper steel plate 231 and the lower steel plate 232 are equal to the width of a single lane of the wireless charging road 20. The distance between the upper steel plate 231 and the top surface of the road surface layer 22 can be in a range of about 5 centimeters to about 10 centimeters so that the magnetic force lines 230 can pass through the upper steel plate 231 and the road surface layer 22.

Figure 2:
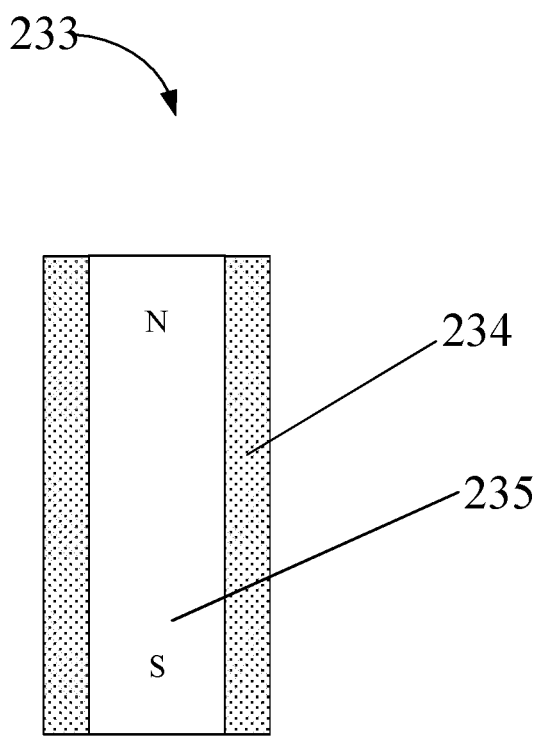
FIG. 2 is a cross-sectional view of a first embodiment of a magnetic body.

Referring to FIG. 2, the magnetic bodies 233 includes a rigid tube 234 and a magnet 235 located in the rigid tube 234. The outer diameter of the rigid tube 234 can be in a range of about 10 centimeters to about 30 centimeters, the thickness of the wall of the rigid tube 234 can be in a range of about 1 centimeter to about 2 centimeters, and the length of the rigid tube 234 can be in a range of about 10 centimeters to about 30 centimeters. In one embodiment, the rigid tube 234 is a nonmagnetic steel tube. The plurality of magnetic bodies 233 are parallel to each other and perpendicular to the upper steel plate 231 and the lower steel plate 232.

Figure 3:
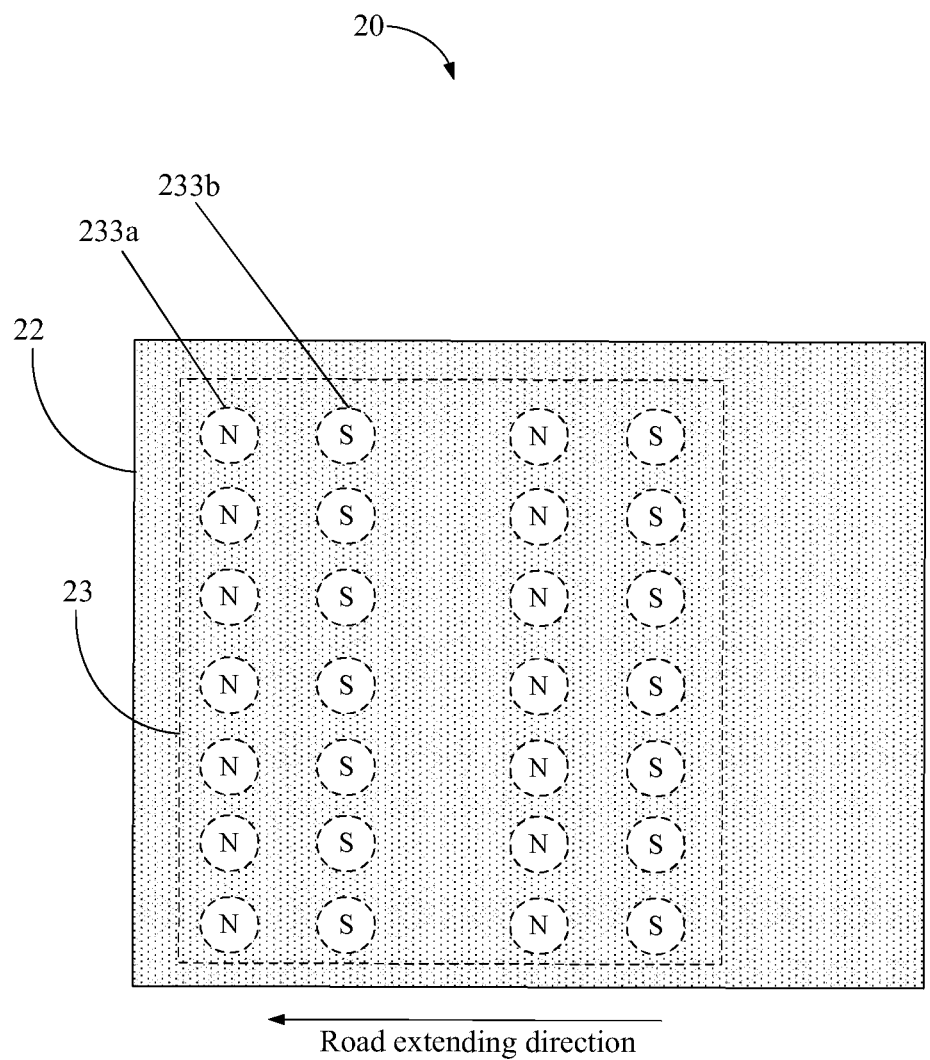
FIG. 3 is a top view of a first embodiment of an arrangement of a plurality of magnetic bodies.

Each of the magnetic bodies 233 has an N pole and an S pole. The one of the magnetic bodies 233 which has the N pole facing upward is defined as the first magnetic body 233a, and the one of the magnetic bodies 233 which has the S pole facing upward is defined as the second magnetic body 233b. Referring to FIG. 3, in one embodiment, a plurality of first magnetic bodies 233a are arranged along the width direction of the wireless charging road 20 to form a first magnetic body group, and a plurality of second magnetic bodies 233b are arranged along the width direction of the wireless charging road 20 to form a second magnetic body group. A plurality of first magnetic body groups and a plurality of second magnetic body groups are alternately located, and a distance between adjacent first magnetic body group and second magnetic body group can be in a range of about 1 meter to about 2 meters. The adjacent first magnetic body group and second magnetic body group form a magnetic body group pair. In each magnetic body group pair, the magnetic force lines 230 come out from the N poles and enter into the S poles. Thus, a plurality of upward curved magnetic force lines 230 are formed above the surface of the wireless charging road 20.

Figure 4:
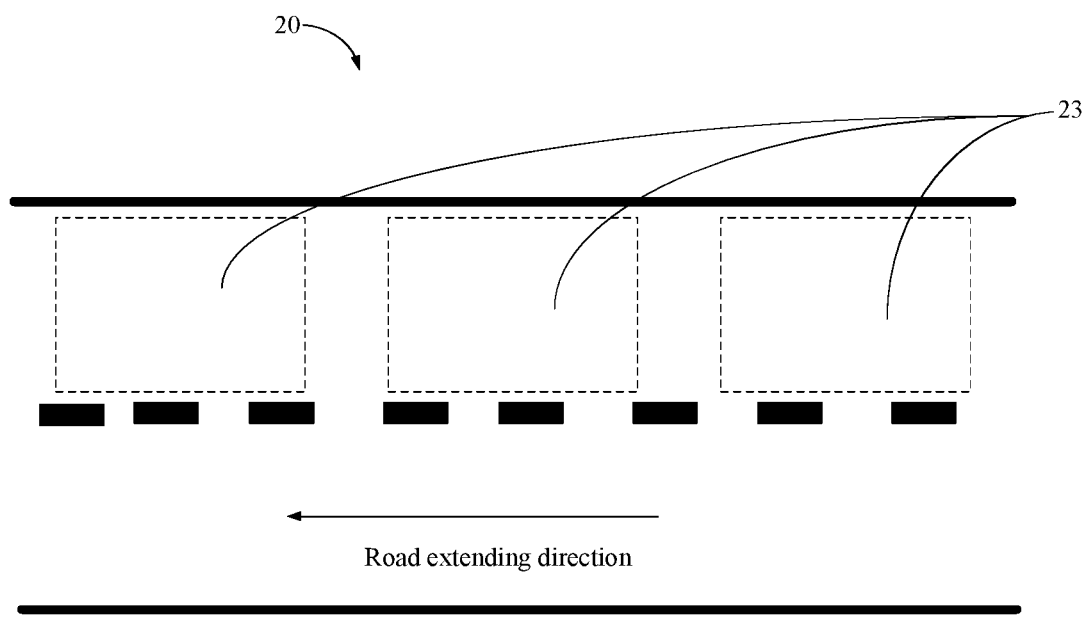
FIG. 4 is a top view of a first embodiment of a wireless charging road.

The spaces among the plurality of magnetic bodies 233 can be empty or filled with the material same as the material of the road basement 21. When the spaces among the plurality of magnetic bodies 233 are filled with material, the plurality of magnetic bodies 233 would suffer less pressure from the vehicle. In one embodiment, the magnetic field generator 23 can only includes the plurality of magnetic bodies 233, and the upper steel plate 231 and the lower steel plate 232 can be omitted. As shown in FIG. 4, in one embodiment, a plurality of magnetic field generators 23 are located on a single lane, spaced apart from each other, and arranged along the road extending direction. Thus, the vehicle running on the wireless charging road 20 can be charged continuously. Each magnetic field generator 23 can includes one or more than one magnetic body group pair.

Figure 5:
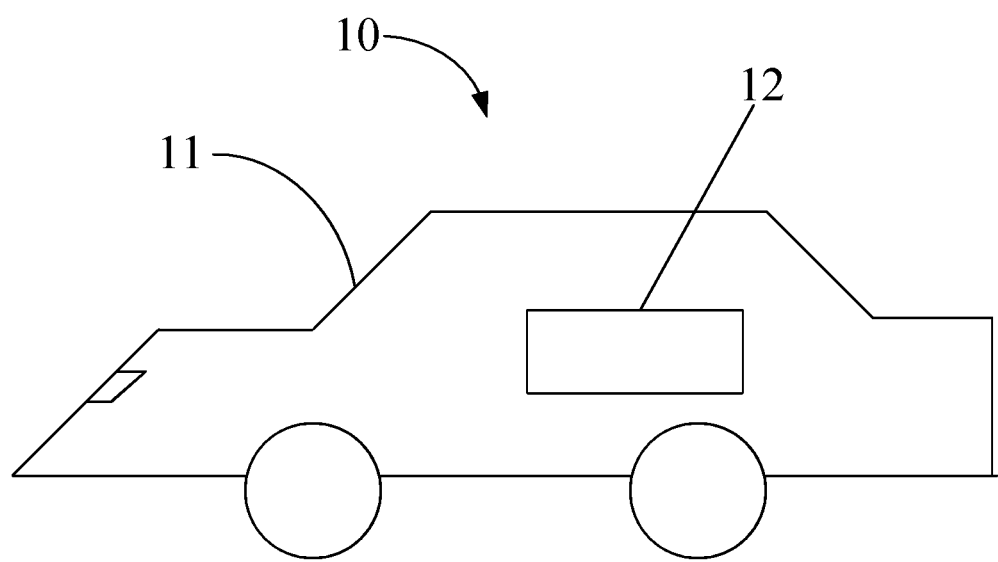
FIG. 5 is a cross-sectional view of a first embodiment of a wireless charging vehicle.

Referring to FIG. 5, the wireless charging vehicle 10 of the first embodiment includes a vehicle body 11 and a charging device 12 located on the vehicle body 11. The charging device 12 can be located inside or outside of the vehicle body 11 as needed.

Figure 6:
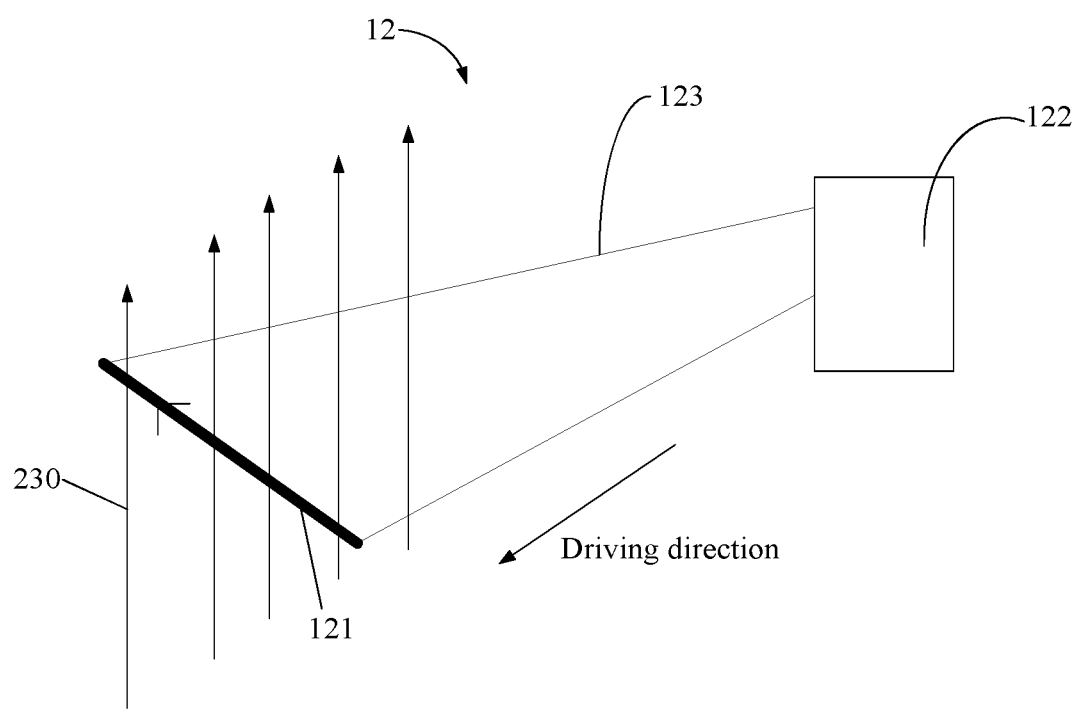
FIG. 6 is a schematic view of a first embodiment of a charging device.

Referring to FIG. 6, the charging device 12 includes at least one induction wire 121 and a rechargeable battery 122. Two ends of the induction wire 121 are respectively connected to the positive pole and the negative pole of the rechargeable battery 122. The induction wire 121 can cut the magnetic force lines 230 when the wireless charging vehicle 10 drives on the wireless charging road 20 above.

The induction wire 121 can be a single wire or a bundle of wires. Each wire includes a metal conductive core and an insulating layer coated on the outer surface of the metal conductive core. The metal conductive core can be a copper string or an aluminum string. The first angle between the length direction of the induction wire 121 and the chassis of the wireless charging vehicle 10 is less than 90 degrees, and the second angle between the length direction of the induction wire 121 and the length of the wireless charging vehicle 10 is greater than 0 degrees. In one embodiment, the length direction of the induction wire 121 is substantially parallel to both the chassis and the width direction of the wireless charging vehicle 10. The induction wire 121 extends from left of the vehicle body 11 to right of the vehicle body 11. When the wireless charging vehicle 10 drives along the wireless charging road 20 above, the induction wire 121 is substantially parallel to the road surface layer 22 and perpendicular the extending direction of the wireless charging road 20.

The rechargeable battery 122 can be any secondary battery, such as lithium ion battery or lead-acid battery. When the induction wire 121 cuts the magnetic force lines 230, an electric potential is generated between two opposite ends of the induction wire 121. Thus, the rechargeable battery 122 can be charged. The electric potential is related to the speed of the wireless charging vehicle 10. The faster the wireless charging vehicle 10, the greater the electric potential is. The rechargeable battery 122 can supply power to the wireless charging vehicle 10. In one embodiment, the induction wire 121 is located outside of the vehicle body 11, such as under the chassis, to avoid the electromagnetic shielding from the vehicle body 11. In one embodiment, the vehicle body 11 can be free of magnetic steel and only have nonmagnetic steel to prevent the induction wire 121 from electromagnetic shielding.

Figure 7:
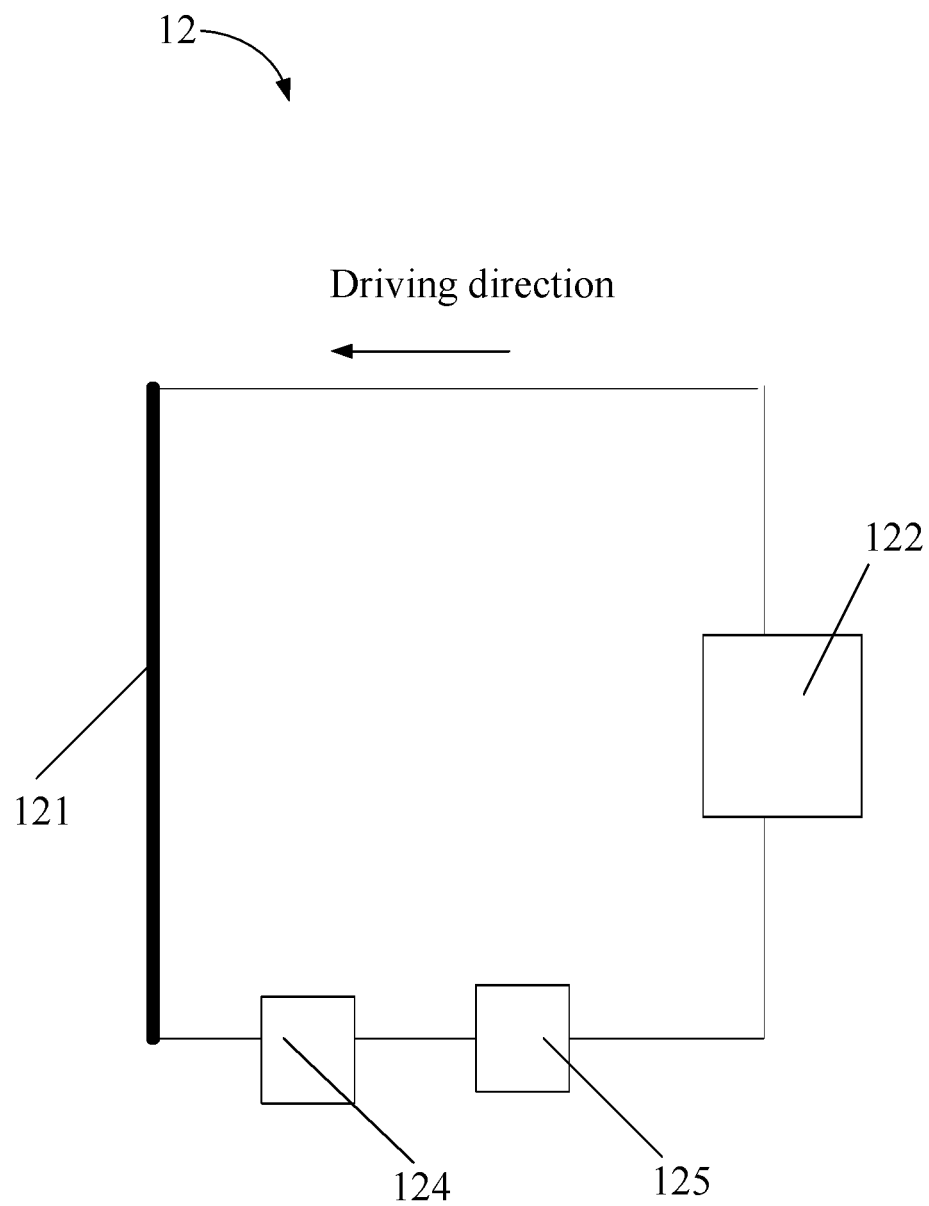
FIG. 7 is a schematic view of a first embodiment of another charging device.

As shown in FIG. 1, a plurality of upward curved magnetic force lines 230 are formed above the surface of the wireless charging road 20. The direction of the magnetic force lines 230 is upward first and then downward. Thus, the plurality of upward curved magnetic force lines 230 includes as upward portion and a downward portion. When the wireless charging vehicle 10 drives along the wireless charging road 20, the induction wire 121 would alternately cuts the upward portion and the downward portion. Thus, current caused in the circuit of the charging device 12 is alternating current. As shown in FIG. 7, the charging device 12 can further includes a commutator 124 so that to obtain direct current. The charging device 12 can also includes a transformer 125 so that to obtain a high voltage.

Figure 8:
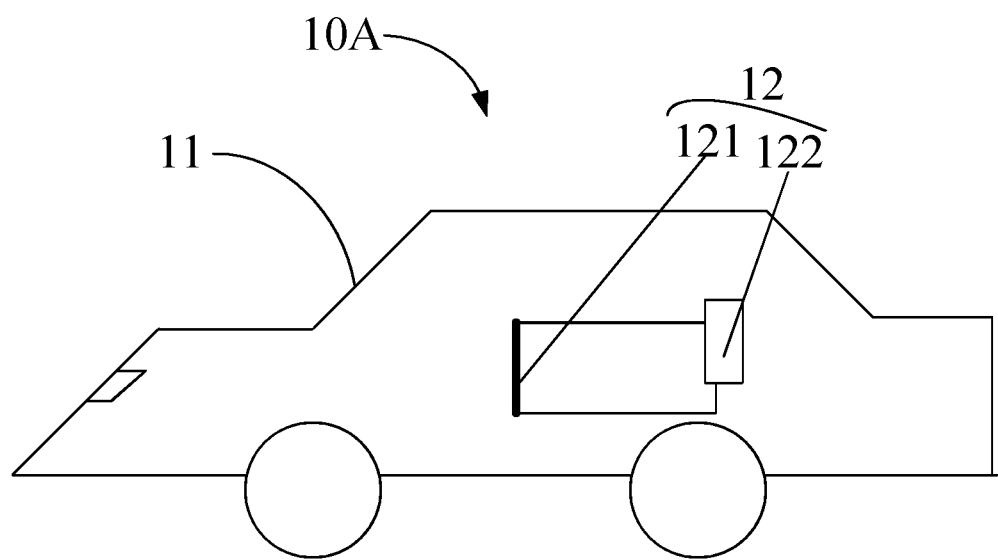
FIG. 8 is a cross-sectional view of a second embodiment of a wireless charging vehicle.

Referring to FIG. 8, a wireless charging vehicle 10A of the second embodiment includes a vehicle body 11 and a charging device 12 located on the vehicle body 11. The charging device 12 can be located inside or outside of the vehicle body 11 as needed. The wireless charging vehicle 10A is similar to the wireless charging vehicle 10 above except that the length direction of the induction wire 121 is substantially perpendicular to the chassis of the wireless charging vehicle 10A. When the wireless charging vehicle 10A drives on the wireless charging road 20A, the length direction of the induction wire 121 is substantially perpendicular to the road surface layer 22 and the induction wire 121 would cut the magnetic force lines 230 that are substantially parallel to the road surface layer 22 and perpendicular to the road extending direction.

Figure 9:
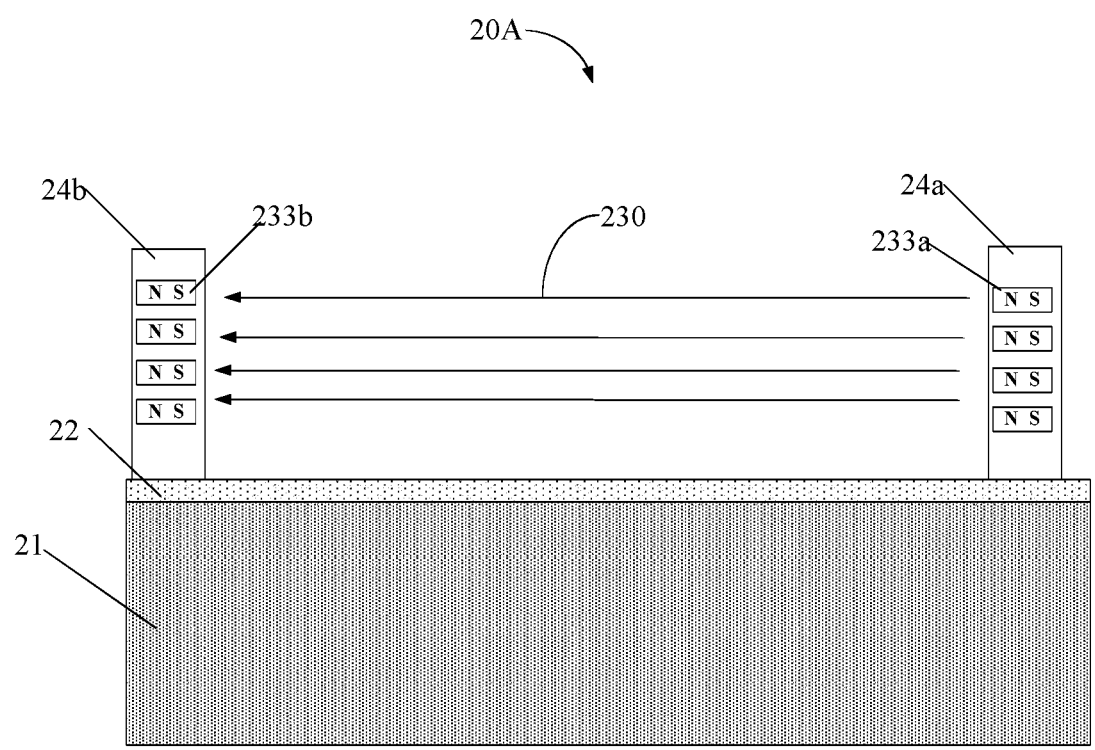
FIG. 9 is a cross-sectional view of a second embodiment of a wireless charging road.

Referring to FIG. 9, a wireless charging road 20A of a second embodiment includes a road basement 21, a road surface layer 22 located on the road basement 21, and a magnetic field generator 23. The wireless charging road 20A is similar to the wireless charging road 20 above except that the wireless charging road 20A further includes a first guardrail 24a and a second guardrail 24b located on two opposite side of the road surface layer 22.

The magnetic field generator 23 includes a plurality of first magnetic bodies 233a located on the first guardrail 24a and a plurality of second magnetic bodies 233b located on the second guardrail 24b. The plurality of first magnetic bodies 233a and the plurality of second magnetic bodies 233b are located in one-to-one relationship. The N pole of each of the plurality of first magnetic bodies 233a is opposite to the S pole of one of the plurality of second magnetic bodies 233b so that the magnetic force lines 230 are substantially parallel to the road surface layer 22 and perpendicular to the road extending direction. The plurality of first magnetic bodies 233a are at least arranged along the road extending direction and spaced from each other. The plurality of first magnetic bodies 233a can be arranged both along the road extending direction and the height direction of the first guardrail 24a to form an array. The density of the plurality of first magnetic bodies 233a along the road extending direction are varied so that density of the magnetic force lines 230 along the road extending direction are varied. Thus, when the wireless charging vehicle 10A drives on the wireless charging road 20A, the magnetic flux passing through the circuit loop of the charging device 12 are varied. When there are two or more than two lanes between the first guardrail 24a and the second guardrail 24b, the wireless charging vehicle 10A driving on each lane can be charged.

Figure 10:
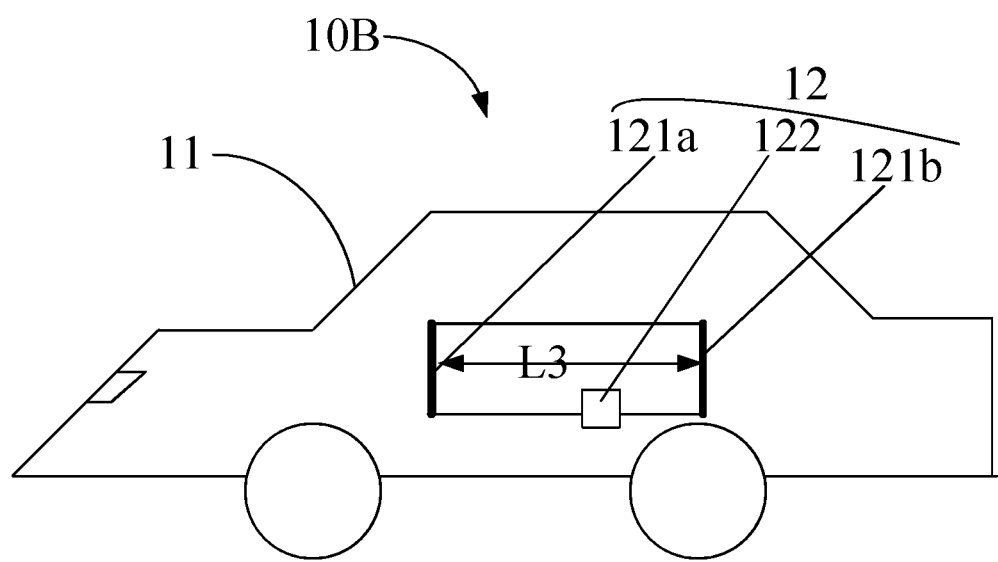
FIG. 10 is a cross-sectional view of a third embodiment of a wireless charging vehicle.

Referring to FIG. 10, a wireless charging vehicle 10B of a third embodiment includes a vehicle body 11 and a charging device 12 located on the vehicle body 11. The charging device 12 can be located inside or outside of the vehicle body 11 as needed. The wireless charging vehicle 10B is similar to the wireless charging vehicle 10A above except that the charging device 12 includes a front induction wire 121a and a rear induction wire 121b substantially parallel to the front induction wire 121a. The front induction wire 121a, the rear induction wire 121b and the rechargeable battery 122 are electrically connected to form a circuit loop. The angle between the front induction wire 121a and the chassis of the wireless charging vehicle 10B is greater than 0 degrees and less than or equal to 90 degrees. The angle between the front induction wire 121a and the chassis of the wireless charging vehicle 10B can be greater than 60 degrees and less than or equal to 90 degrees. In one embodiment, both the front induction wire 121a and the rear induction wire 121b are perpendicular to the chassis of the wireless charging vehicle 10B, and a distance L3 is defined between the front induction wire 121a and the rear induction wire 121b.

Figure 11:
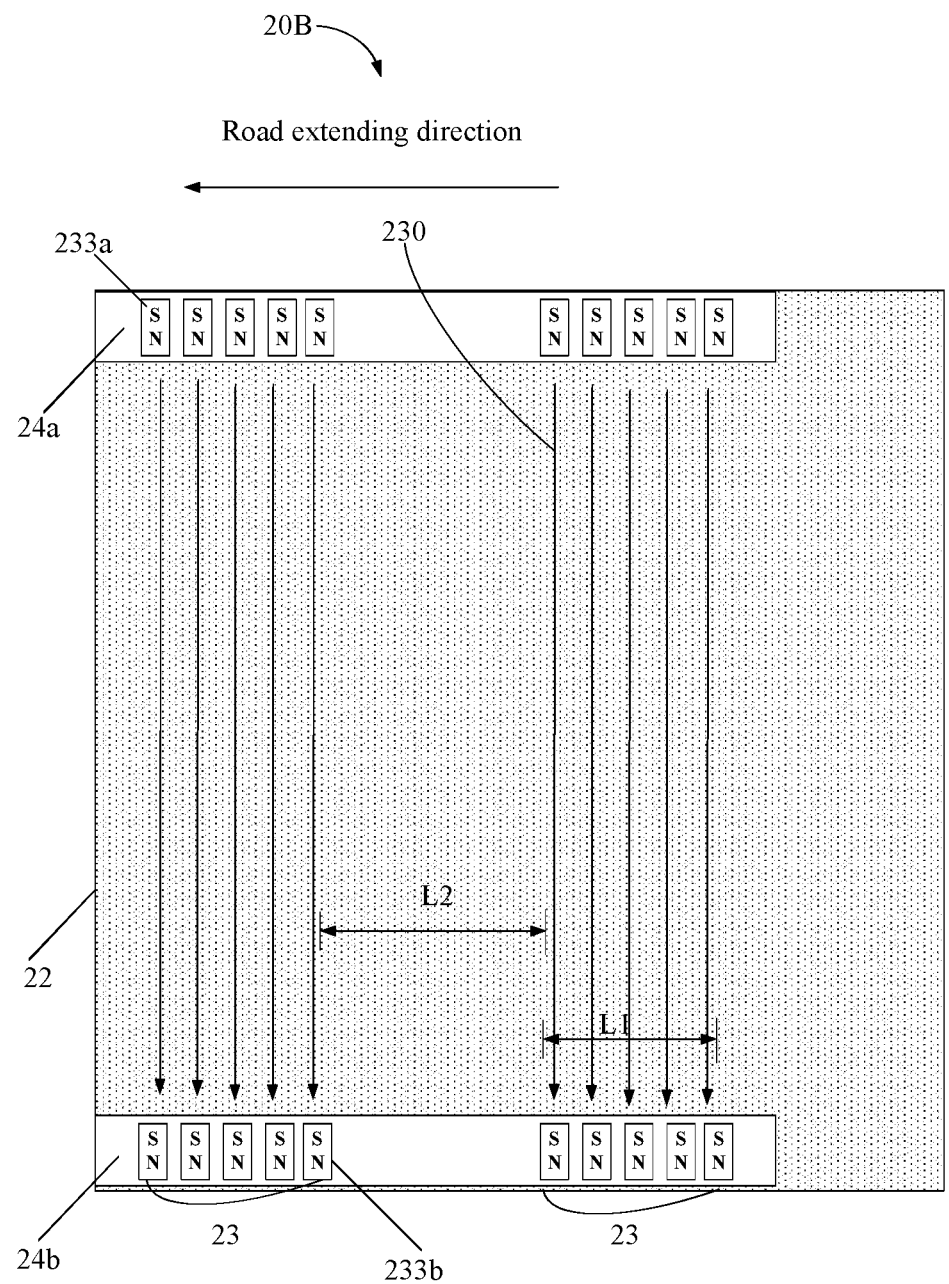
FIG. 11 is a top view of a third embodiment of a wireless charging road.

Referring to FIG. 11, a wireless charging road 20B of a third embodiment includes a road basement 21, a road surface layer 22 located on the road basement 21, a first guardrail 24a and a second guardrail 24b located on two opposite side of the road surface layer 22, and a plurality of magnetic field generators 23.

The wireless charging road 20B is similar to the wireless charging road 20A above except that the a plurality of magnetic field generators 23 are located on the first guardrail 24a and the second guardrail 24b and spaced apart from each other along the road extending direction. Each of the plurality of magnetic field generators 23 includes a plurality of first magnetic bodies 233a located on the first guardrail 24a and a plurality of second magnetic bodies 233b located on the second guardrail 24b. In each of the plurality of magnetic field generators 23, the plurality of first magnetic bodies 233a are arranged in equidistance, and the plurality of second magnetic bodies 233b are arranged in equidistance. Each of the plurality of magnetic field generators 23 has a length L1 along the road extending direction, adjacent two of the plurality of magnetic field generators 23 has a distance L2 along the road extending direction, and L1<L3<L2. Thus, the front induction wire 121a and the rear induction wire 121b would not simultaneously cut the magnetic force lines 230. When the front induction wire 121a enters and cuts the magnetic force lines 230 of one field generator 23, the rear induction wire 121b is between adjacent two field generators 23 and would not cut any magnetic force lines 230. When the rear induction wire 121b enters and cuts the magnetic force lines 230 of the one field generator 23, the front induction wire 121a has moved out of the magnetic force lines 230 of the one field generator 23, entered a place between adjacent two field generators 23 and without any magnetic force lines 230. If the front induction wire 121a and the rear induction wire 121b simultaneously cut the magnetic force lines 230, the first electric potential generated between two opposite ends of the front induction wire 121a is opposite to the second electric potential generated between two opposite ends of the rear induction wire 121b. The first electric potential may cancel out the second electric potential.

Figure 12:
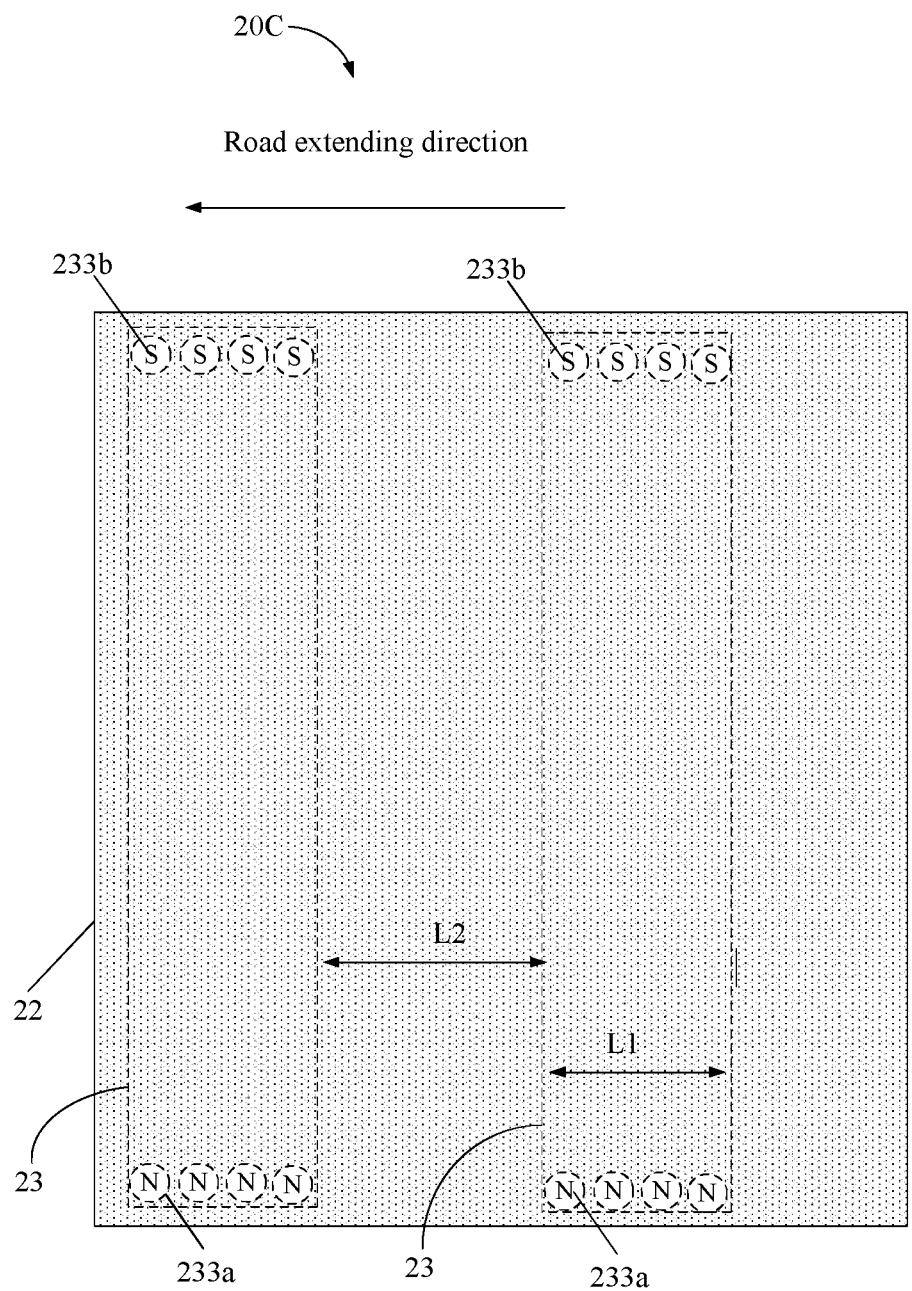
FIG. 12 is a top view of a fourth embodiment of a wireless charging road.

Referring to FIG. 12, a wireless charging road 20C of a fourth embodiment includes a road basement 21, a road surface layer 22 located on the road basement 21, and a plurality of magnetic field generators 23.

The wireless charging road 20C is similar to the wireless charging road 20B above except that the plurality of first magnetic bodies 233a and the plurality of second magnetic bodies 233b are located on two opposite side of the road surface layer 22, in the road basement 21, and arranged long the road extending direction. The plurality of first magnetic bodies 233a and the plurality of second magnetic bodies 233b are substantially perpendicular to the road surface layer 22 as shown in FIG. 1. A plurality of upward curved magnetic force lines 230 are formed above the road surface layer 22 and extends from one side of the road surface layer 22 to the other side of the road surface layer 22. The wireless charging road 20C is designed for the wireless charging vehicle 10B above. The distance L3 is between the front induction wire 121a and the rear induction wire 121b is greater than the length L1 of the magnetic field generator 23 and less than the distance L2 between adjacent two magnetic field generators 23. Thus, the front induction wire 121a and the rear induction wire 121b would not simultaneously cut the magnetic force lines 230.

Figure 13:
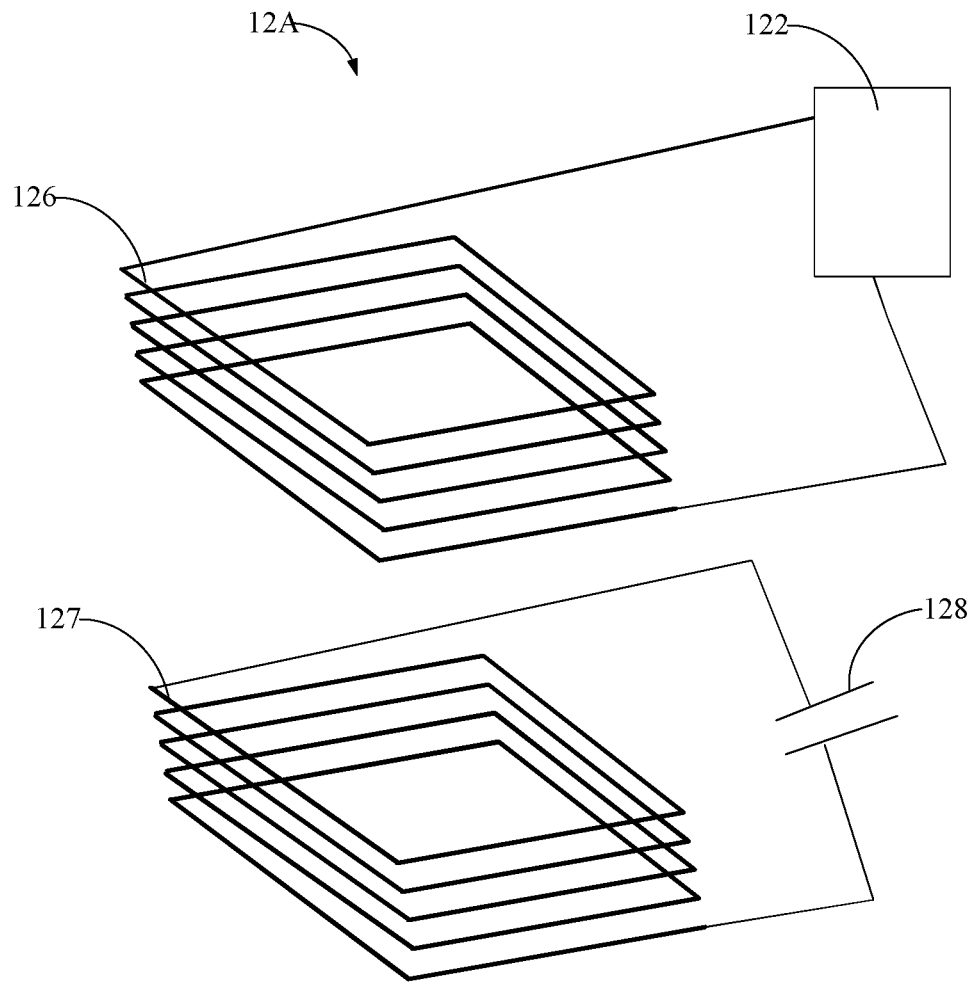
FIG. 13 is a schematic view of a fifth embodiment of a charging device.

Referring to FIG. 13, a wireless charging vehicle (not shown) of a fifth embodiment includes a charging device 12A. The charging device 12A includes a first induction coil 126, a rechargeable battery 122 connected to the two ends of the first induction coil 126, and a second induction coil 127 parallel and spaced apart from the first induction coil 126. The two ends of the second induction coil 127 are connected to a coupling capacitor 128. When the wireless charging vehicle including the charging device 12A drives on the wireless charging roads 20, 20A, 20B, 20C above, an inductive electromagnetic field is produced in the second induction coil 127, and then an inductive current can be produced in the first induction coil 126 by electromagnetic coupling. Thus, the rechargeable battery 122 can be charged by the first induction coil 126.

Figure 14:
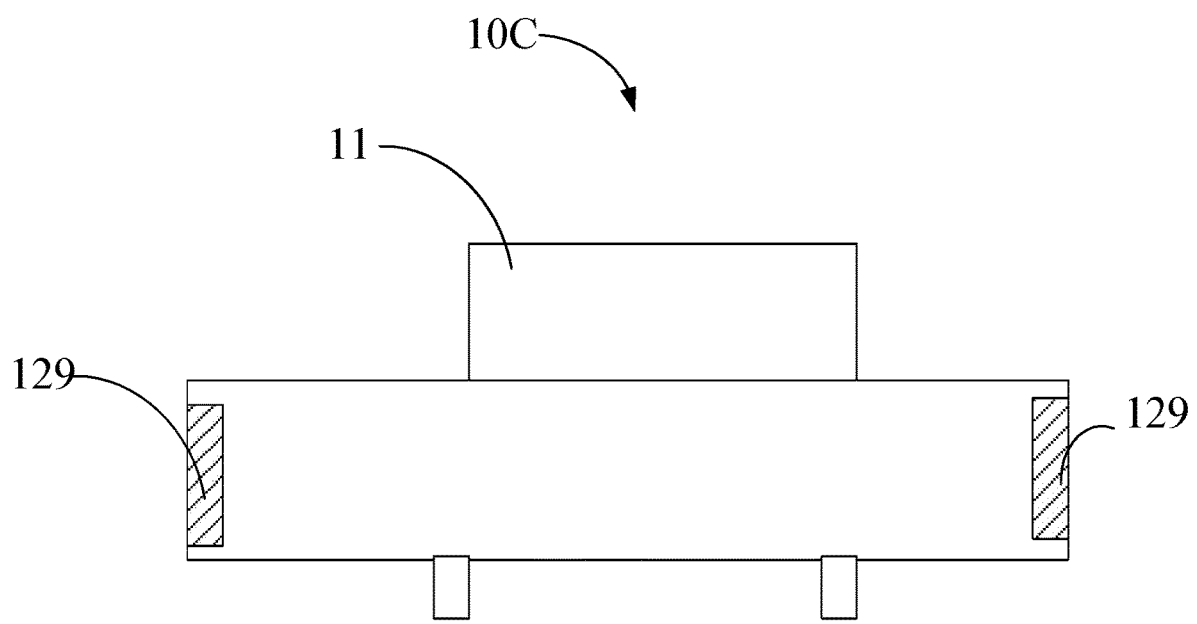
FIG. 14 is a cross-sectional view of a sixth embodiment of a wireless charging vehicle.

Referring to FIG. 14, a wireless charging vehicle 10C of a sixth embodiment includes a vehicle body 11 and two electrodes 129 located on the outside of the metal shell of the vehicle body 11. The two electrodes 129 are connected to the rechargeable battery (not shown) of the wireless charging vehicle 10C. When the wireless charging vehicle 10C drives on the wireless charging roads 20, 20A, 20B, 20C above, the metal shell of the vehicle body 11 would cut the magnetic force lines 230 and produce a electric potential between the two electrodes 129.

The wireless charging vehicles and the wireless charging roads allow the vehicles to self charge during driving by electric power generation. Thus, the wireless charging vehicles and the wireless charging roads can save time for charge parking and waste less energy. Furthermore, the weight of the vehicles would be increased by the magnetic force of the magnetic field generators, and the vehicles would be more stable during driving on the wireless charging roads.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A wireless charging road, comprising:
   a road basement;
   a road surface layer positioned on the road basement;
   a first guardrail and a second guardrail positioned on two opposite sides of the road surface layer; and
   a magnetic field generator on the first guardrail and the second guardrail, wherein the magnetic field generator is configured to generate magnetic force lines above the road surface layer so that a wireless charging vehicle cuts the magnetic force lines to produce an electric potential when the wireless charging vehicle drives on the road surface layer.

2. The wireless charging road of claim 1, wherein the magnetic field generator comprises a plurality of first magnetic bodies positioned on the first guardrail and a plurality of second magnetic bodies positioned on the second guardrail.

3. The wireless charging road of claim 2, wherein a N pole of each of the plurality of first magnetic bodies is opposite to a S pole of one of the plurality of second magnetic bodies so that the magnetic force lines are substantially parallel to the road surface layer and perpendicular to a road extending direction.

4. The wireless charging road of claim 3, wherein a first density of the plurality of first magnetic bodies along the road extending direction are varied, and a second density of the plurality of second magnetic bodies along the road extending direction are varied.

5. A wireless charging road, comprising:
   a road basement;
   a road surface layer on the road basement; and
   a magnetic field generator, wherein the magnetic field generator comprises a plurality of first magnetic bodies and a plurality of second magnetic bodies, the first magnetic bodies and the second magnetic bodies being alternately positioned; each of the plurality of first magnetic bodies and each of the plurality of second magnetic bodies comprising a rigid tube and a magnet in the rigid tube, wherein the magnetic field generator is configured to generate magnetic force lines above the road surface layer, and produce an electric potential when the magnetic force lines intersect with charging vehicles.

6. The wireless charging road of claim 5, wherein the magnetic field generator is positioned in the road basement.

7. The wireless charging road of claim 6, wherein each of the plurality of first magnetic bodies comprises a N pole facing upward, and each of the plurality of second magnetic bodies comprises a S pole facing upward.

8. The wireless charging road of claim 7, wherein the magnetic field generator further comprises an upper steel plate and a lower steel plate parallel to and spaced apart from the upper steel plate; and the plurality of first magnetic bodies and the plurality of second magnetic bodies are vertically placed between the upper steel plate and the lower steel plate.

9. The wireless charging road of claim 5, further comprising a first guardrail and a second guardrail positioned on two opposite side of the road surface layer; wherein the plurality of first magnetic bodies are on the first guardrail, and the plurality of second magnetic bodies are on the second guardrail.

10. The wireless charging road of claim 9, wherein a N pole of each of the plurality of first magnetic bodies is opposite to a S pole of one of the plurality of second magnetic bodies so that the magnetic force lines are substantially parallel to the road surface layer and perpendicular to a road extending direction.

11. The wireless charging road of claim 10, wherein a first density of the plurality of first magnetic bodies along the road extending direction are varied, and a second density of the plurality of second magnetic bodies along the road extending direction are varied.

12. A wireless charging road, comprising:
a road basement;
a road surface layer on the road basement; and
a plurality of magnetic field generators spaced apart from each other along a road extending direction, wherein the plurality of magnetic field generators is configured to generate magnetic force lines above the road surface layer, and produce an electric potential when the magnetic force lines intersect with charging vehicles having a front induction wire and a rear induction wire spaced apart from each other with a distance L3; each of the plurality of magnetic field generators has a length L1 along the road extending direction, adjacent two of the plurality of magnetic field generators has a distance L2 along the road extending direction, and L1<L3<L2.

13. The wireless charging road of claim 12, wherein each of the plurality of magnetic field generators comprises a plurality of first magnetic bodies and a plurality of second magnetic bodies positioned on two opposite side of the road surface layer.

14. The wireless charging road of claim 13, wherein each of the plurality of first magnetic bodies and each of the plurality of second magnetic bodies comprises a rigid tube and a magnet in the rigid tube.

15. The wireless charging road of claim 13, wherein each of the plurality of magnetic field generators further comprises an upper steel plate and a lower steel plate parallel to and spaced apart from the upper steel plate; and the plurality of first magnetic bodies and the plurality of second magnetic bodies are vertically placed between the upper steel plate and the lower steel plate.

16. The wireless charging road of claim 13, further comprising a first guardrail and a second guardrail positioned on two opposite side of the road surface layer; wherein the plurality of first magnetic bodies are on the first guardrail, and the plurality of second magnetic bodies are on the second guardrail.

17. The wireless charging road of claim 16, wherein a N pole of each of the plurality of first magnetic bodies is opposite to a S pole of one of the plurality of second magnetic bodies so that the magnetic force lines are substantially parallel to the road surface layer and perpendicular to a road extending direction.

18. The wireless charging road of claim 12, wherein the front induction wire and the rear induction wire cannot simultaneously cut the magnetic force lines when the wireless charging vehicle drives on the road surface layer.

19. The wireless charging road of claim 18, wherein a first density of the plurality of first magnetic bodies along the road extending direction are varied, and a second density of the plurality of second magnetic bodies along the road extending direction are varied.

* * * * *